(12) United States Patent
Wentz

(10) Patent No.: US 11,191,218 B1
(45) Date of Patent: Dec. 7, 2021

(54) BALE SHREDDER WITH ELEVATED DISCHARGE

(71) Applicant: Ethen D Wentz, Menno, SD (US)

(72) Inventor: Ethen D Wentz, Menno, SD (US)

( * ) Notice: Subject to any disclaimer, the term of this patent is extended or adjusted under 35 U.S.C. 154(b) by 268 days.

(21) Appl. No.: 15/336,124

(22) Filed: Oct. 27, 2016

(51) Int. Cl.
| | | |
|---|---|---|
| *A01F 29/00* | (2006.01) |
| *A01F 29/10* | (2006.01) |
| *A01F 29/12* | (2006.01) |
| *B02C 13/04* | (2006.01) |
| *B02C 13/286* | (2006.01) |

(52) U.S. Cl.
CPC ............ *A01F 29/005* (2013.01); *A01F 29/10* (2013.01); *A01F 29/12* (2013.01); *B02C 13/04* (2013.01); *B02C 13/286* (2013.01); *B02C 2013/28609* (2013.01); *B02C 2013/28636* (2013.01)

(58) Field of Classification Search
CPC ........ A01F 29/00; A01F 29/005; A01F 29/09; A01F 29/10; A01F 29/12; A01F 29/14
USPC ............................................. 241/605, 101.76
See application file for complete search history.

(56) References Cited

U.S. PATENT DOCUMENTS

| | | | | |
|---|---|---|---|---|
| 1,467,131 | A * | 9/1923 | Wikel ...................... | A01F 29/00 241/155 |
| 2,575,639 | A * | 11/1951 | Scranton ................ | B65G 65/46 222/142 |
| 2,775,991 | A * | 1/1957 | Elliott ..................... | A01F 29/00 198/624 |
| 3,063,723 | A * | 11/1962 | Toft ........................ | A01C 3/066 198/611 |
| 3,509,924 | A * | 5/1970 | Newhouse, Jr. ....... | A01F 29/005 241/190 |
| 3,771,733 | A | 11/1973 | Hadley | |
| 3,873,032 | A * | 3/1975 | Jellis, Jr. ............. | A01D 87/0038 198/583 |
| 3,926,378 | A * | 12/1975 | Ryan ..................... | A01D 90/105 241/101.76 |
| 3,948,451 | A * | 4/1976 | Pecis ...................... | A01K 5/002 241/154 |
| 4,088,272 | A | 5/1978 | Grillot | |
| 4,345,417 | A * | 8/1982 | deBuhr ................... | A01F 29/09 241/101.742 |
| 4,381,082 | A * | 4/1983 | Elliott ................... | A01F 29/005 241/186.5 |

(Continued)

*Primary Examiner* — Adam J Eiseman
*Assistant Examiner* — Bobby Yeonjin Kim
(74) *Attorney, Agent, or Firm* — Jeffrey A. Proehl; Woods, Fuller, Shultz & Smith, PC

(57) ABSTRACT

A bale shredder may comprise a bale hopper defining an interior bale chamber for receiving a bale to be shredded, a bale shredding assembly to shred a bale in the chamber including a shredding rotor having a plurality of flails to contact a bale in the bale chamber, and a passage for receiving material shredded by the shredding rotor. In embodiments, a conveying assembly may facilitate material flow through the passage with a moving conveying surface. A collecting auger assembly may collect material ejected by the shredding rotor through the passage and may include an auger with an auger shaft rotatable about a rotation axis. In embodiments, a discharge assembly with a discharge rotor configured to receive the shredded material from the collecting auger assembly and expel the material through a discharge opening, and the discharge rotor may rotate on the auger shaft of the collecting auger assembly.

1 Claim, 4 Drawing Sheets

(56) References Cited

U.S. PATENT DOCUMENTS

| | | | | |
|---|---|---|---|---|
| 4,420,119 | A | * 12/1983 | Johnson | A01F 25/14 241/101.4 |
| 4,982,658 | A | 1/1991 | Knudson | |
| 5,255,867 | A | 10/1993 | Whittleton | |
| 5,865,589 | A | 2/1999 | Reyher | |
| 6,202,950 | B1 | 3/2001 | Hruska | |
| 6,896,215 | B2 | 5/2005 | Lucas | |
| 8,066,208 | B2 | 11/2011 | Bennett | |
| 9,078,412 | B2 * | 7/2015 | Dube | A01K 1/015 |
| 9,204,597 | B2 | 12/2015 | Wentz | |
| 2003/0075629 | A1 | 4/2003 | Lucas | |
| 2006/0175445 | A1 * | 8/2006 | Hoovestol | A01D 90/08 241/101.74 |
| 2011/0139910 | A1 * | 6/2011 | Neudorf | A01D 87/127 241/25 |
| 2011/0220748 | A1 * | 9/2011 | Bennett | A01F 29/005 241/30 |
| 2013/0193247 | A1 | 8/2013 | Graham | |
| 2015/0069158 | A1 | 3/2015 | Graham | |
| 2015/0090817 | A1 * | 4/2015 | Stam | A01F 29/10 241/28 |
| 2015/0102146 | A1 * | 4/2015 | Neudorf | A01F 29/12 241/101.5 |

\* cited by examiner

BALE SHREDDER WITH ELEVATED DISCHARGE

BACKGROUND

Field

The present disclosure relates to agricultural bale shredders and more particularly pertains to a new bale shredder with an elevated discharge for discharging shredded bale material over greater distances.

SUMMARY

In one aspect, the present disclosure relates to a bale shredder apparatus comprising a frame and a bale hopper mounted on the frame and configured to receive a bale to be shredded, with the bale hopper defining an interior bale chamber and having a bale feed opening being formed in the bale hopper. A bale shredding assembly may be configured to shred material of a bale positioned in the bale chamber, and may include a rotor housing defining a rotor chamber with the rotor chamber being in communication with the bale chamber through the bale feed opening. The rotor housing may have an outlet opening through which material from the bale is moved out of the rotor chamber. The bale shredding assembly may also include a shredding rotor positioned in the rotor chamber and being rotatable about a rotation axis, with the shredding rotor having a plurality of flails which at least partially extend through the bale feed opening to contact a bale in the bale chamber. The apparatus may include a passage positioned adjacent to the shredding rotor for receiving material shredded by the shredding rotor. The passage may have an entry positioned adjacent to the bale shredding rotor and in communication with the outlet opening of the rotor chamber, an exit, an upper surface defining a top of the passage, and a lower surface positioned in substantial opposition to the upper surface and defining a bottom of the passage. The apparatus may also include a collecting auger assembly configured to collect material ejected by the shredding rotor of the bale shredding assembly, with the collecting auger assembly being positioned at the exit of the passage such that the passage is positioned between the shredding rotor and the collecting auger assembly. The apparatus may further include a conveying assembly configured to facilitate material flow in the passage, with the conveying assembly having a conveying surface configured to move in a flow direction oriented substantially perpendicular to the rotation axis of the shredding rotor. The conveying surface may form at least a portion of the lower surface of the passage.

In another aspect, the disclosure relates to a bale shredder apparatus comprising a frame and a bale hopper mounted on the frame and configured to receive a bale to be shredded, with the bale hopper defining an interior bale chamber, a bale feed opening being formed in the bale hopper. A bale shredding assembly is configured to shred material of a bale positioned in the bale chamber. A passage may be positioned adjacent to the bale shredding assembly for receiving material shredded by the shredding assembly, and may have an entry and an exit. The apparatus may also include a collecting auger assembly configured to collect material ejected by the shredding rotor of the bale shredding assembly, with the collecting auger assembly having a receiving end positioned adjacent to the exit of the passage to collect material moving through the passage and a delivery end opposite of the receiving end with a delivery opening. The collecting auger assembly may include an auger housing defining an auger chamber, an auger shaft extending through the auger chamber and being rotatable with respect to the housing about a rotation axis, and auger flighting mounted on at least a portion of the auger shaft positioned in the auger chamber. A discharge assembly may be configured to discharge the shredded material, with the discharge assembly receiving shredded material from the collecting auger assembly and discharging the shredded material from a discharge opening. The discharge assembly may comprise a discharge housing defining an interior, with the interior being in communication with the auger chamber through an inlet opening of the discharge housing. The discharge assembly may further include a discharge rotor configured to receive the shredded material from the collecting auger assembly and expel the material through the discharge opening. The discharge rotor may rotate about the rotation axis of the auger shaft of the collecting auger assembly.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
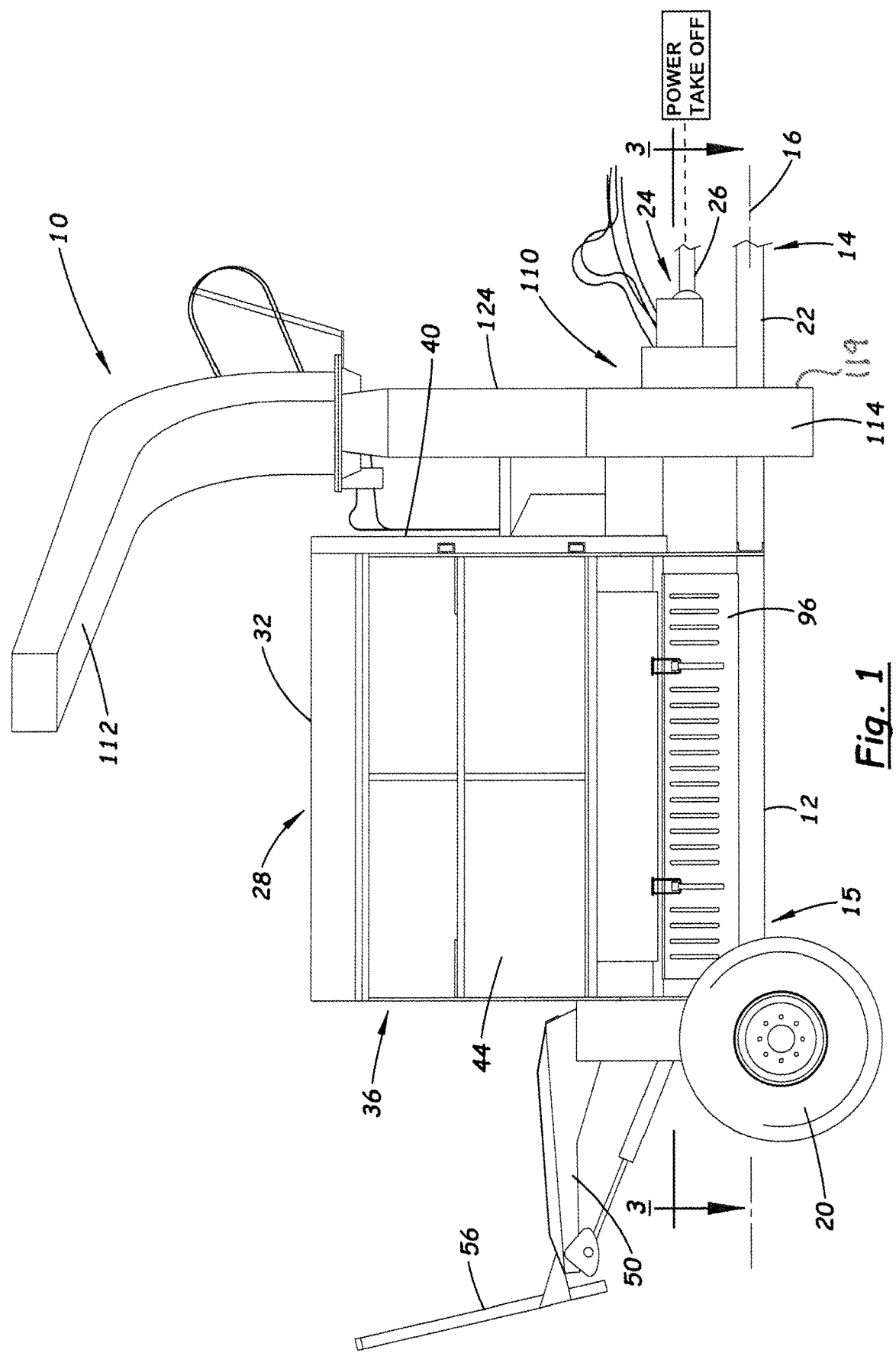
FIG. 1 is a schematic side view of a new bale shredder with elevated discharge according to the present disclosure.
Figure 2:
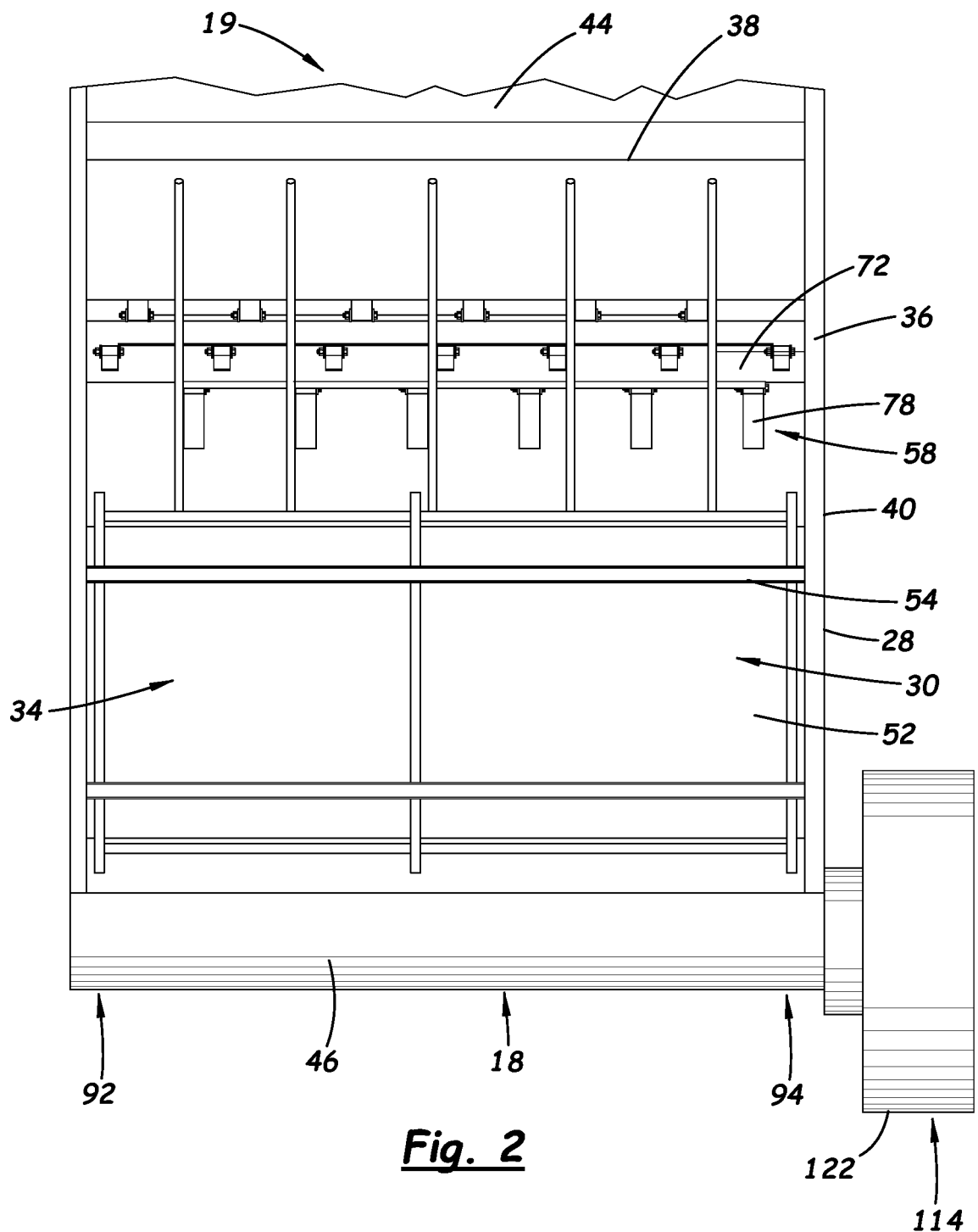
FIG. 2 is a schematic top view of the bale hopper of the bale shredder, according to an illustrative embodiment.
Figure 3:
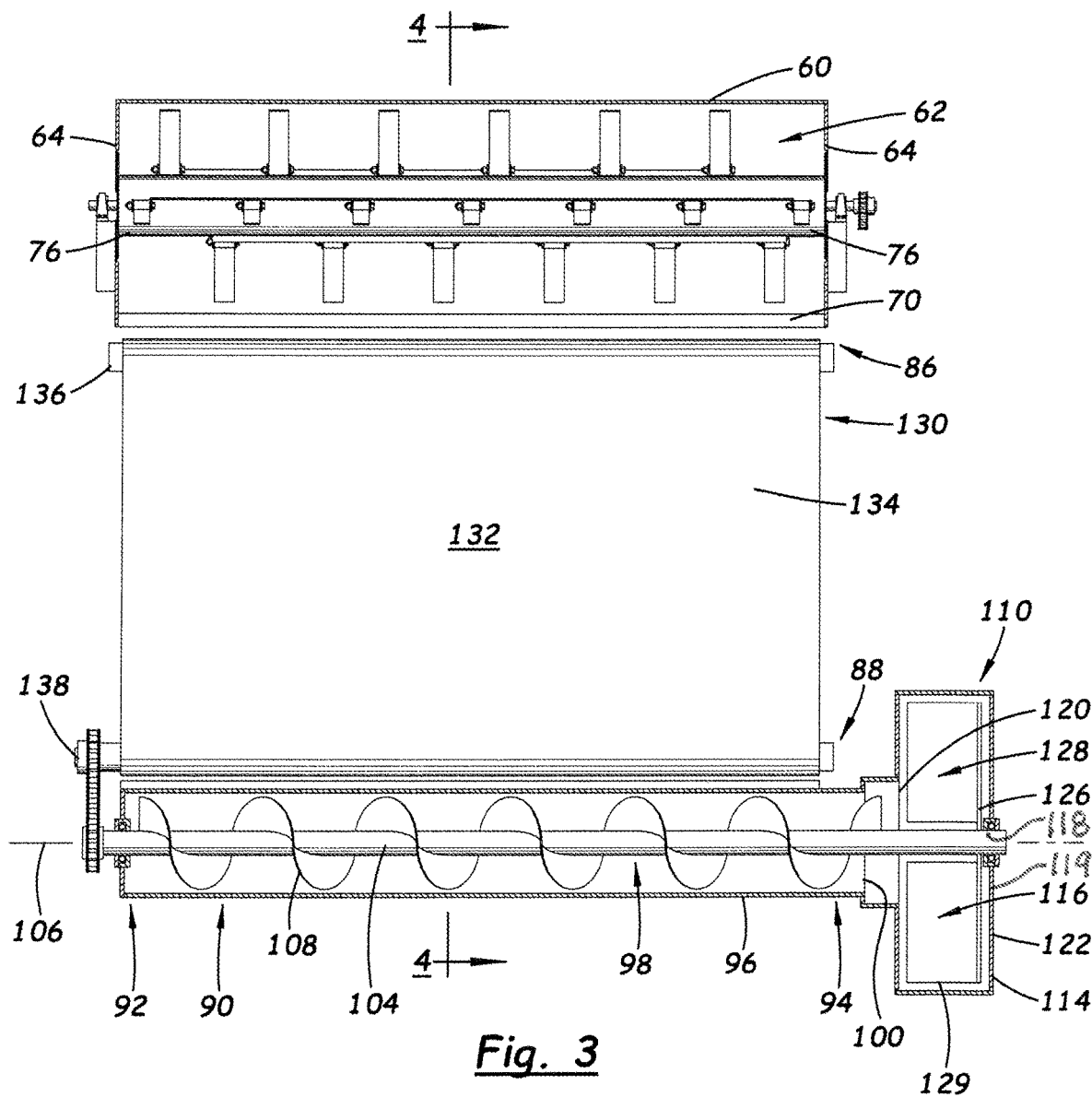
FIG. 3 is a schematic sectional view of the bale shredder taken along line 3-3 in FIG. 1, according to an illustrative embodiment.
Figure 4:
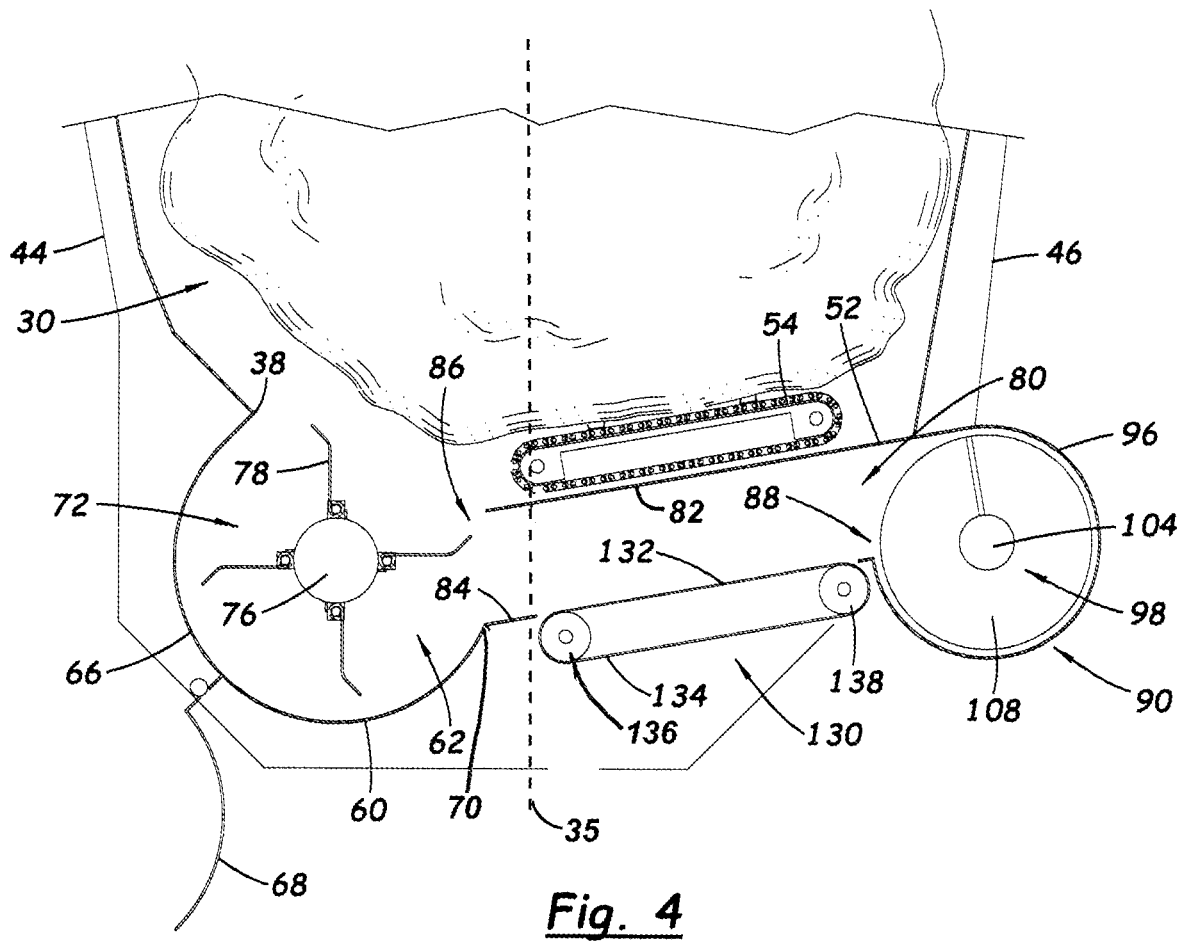
FIG. 4 is a schematic sectional view of the bale shredder taken along line 4-4 in FIG. 2, according to an illustrative embodiment.

With reference now to the drawings, and in particular to FIGS. 1 through 4 thereof, a new bale shredder with an elevated discharge embodying the principles and concepts of the disclosed subject matter will be described.

In some bale shredding apparatus, the shredded material is torn away from a bale in the hopper and ejected by the shredding rotor through a passage below the hopper out of the bale shredder in a substantially horizontal flow direction, while other apparatus are configured to dispense the shredded material at a higher vertical elevation so that the material can be directed and deposited a significant distance away from the apparatus.

The applicant has recognized that the existing designs for such elevated discharge shredding apparatus have some significant drawbacks. For example, a collecting auger is positioned at the end of the passage to collect the shredded material ejected from the shredding rotor. The shredded material tends to fly through the passage to the collecting auger with little trouble when the material is dry, but the applicant has recognized that wet or moist material tends to stick to the lower surface of the passage and accumulate until a clog of the passage occurs, which has to be cleared prior to further operation of the apparatus.

In one aspect, this disclosure describes the placement of a belt between the shredding rotor and the collecting auger to facilitate movement of any material accumulating on the lower surface of the passage to the collecting auger to reduce the problems occurring when wet material is being processed.

Further, the applicant has recognized that the output end of the collecting auger, which conveys the material to a centrifugal fan that accelerates the material into a chute, is typically at least partially blocked by a bearing and support block that supports the end of the auger. This constriction of the auger output tends to collect shredded material and lead to clogging of the output, and then also requires stoppage of the apparatus and clearing before further operation of the apparatus. The applicant has recognized that attempting to support the entire auger solely on the far end of the auger requires a substantial increase in the size of the single bearing as well as the auger shaft, increasing the weight and expense of the apparatus.

In another aspect, the disclosure contemplates placing both the collecting auger and the accelerating fan on a common shaft to thus eliminate the need for a support bearing for the auger shaft and for the fan support shaft between the auger and the fan, reducing the constriction caused by the presence of the support bearing. The auger and the accelerating fan may thus be rotated at the same rotational speed. A further advantage of this configuration is that the shredded material is delivered to the accelerating fan closer to the center of rotation of the fan where the speed of the blades is relatively slower than the speed at the blade tip, and therefore any damage caused by foreign material moving through the apparatus is potentially reduced.

In some more detailed aspects, the disclosure relates to a bale shredder 10 that is generally configured to shred or otherwise pull stems or stalks or leaves of material from a bale formed of the material. The material may comprise hay or other crop materials that may be used, for example, to feed or bed livestock animals. The material is typically formed into a bale at the time of harvesting the crop material (or some period of time after cutting when the material has sufficiently dried) for storage until needed, and the bale may have various exterior shapes. At the time of use, the bale is typically broken up or shredded into smaller pieces of the material that are more suitable for consumption by livestock or used as bedding by the animal. The bale may be held together by cordage or twine or a sheet material that may be torn away from the bale as material is removed from the bale.

The bale shredder 10 may include a frame 12 which may have a front 14 and a rear 15 with a longitudinal axis 16 which extends generally from the front to the rear and generally aligns with the normal direction of movement of the frame when the bale shredder 10 is being towed or otherwise moved across the ground surface. The frame may have lateral sides 18, 19 and may be supported above the ground surface by a pair of wheels 20 which may be mounted on an axle which in turn may be mounted on the frame. The frame 12 may have a hitch portion 22 extending forwardly for connecting the frame to a towing vehicle. In some embodiments, a power take off coupling assembly 24 may be utilized for coupling to a power take-off (PTO) of the towing vehicle in order to power the shredder 10. The coupling assembly 24 may include a coupling shaft 26 which extends forwardly generally adjacent to the hitch portion and which has a forward end that is configured to be coupled to the PTO of the towing vehicle.

The bale shredder 10 may also include a bale hopper 28 which is configured to receive a bale to be shredded. The bale hopper 28 may define an interior bale chamber 30 into which a bale is received and positioned while being shredded. The bale hopper may have an upper opening 32 into the bale chamber and may also have a chamber bottom 34 positioned opposite of the upper opening at the lower extent of the bale chamber. The bale hopper may comprise a perimeter 36 formed of walls, and a bale feed opening 38 may be formed in the perimeter and may extend to the bottom 34. The perimeter 36 may include a front wall 40 positioned toward the front of the frame, and a primary side wall 44 extending rearwardly from the front wall. The bale feed opening 38 may be positioned in the primary side wall 44. The perimeter 36 may also include a secondary side wall 46 which extends rearwardly from the front wall and may be positioned opposite of the primary side wall on an opposite side of the bale chamber 30 as well as opposite of the bale feed opening. In some embodiments, the secondary side wall may be movable to permit removal of a bale from the bale chamber, such as is disclosed in U.S. Pat. Nos. 9,027,863 and 9,204,597, both of which are hereby incorporated by reference in their entireties. The perimeter 36 may also have a rear wall 50 which is positioned substantially rearwardly of and opposite of the front wall 40. In some embodiments, the rear wall may be movable to facilitate loading of a bale into the bale chamber. A floor 52 may be positioned toward the bottom 34 of the bale chamber and may have an upper surface.

The bale shredder 10 may also include a primary bale movement assembly 54 which is configured to move a bale in the bale chamber toward the bale feed opening 38. Optionally, a secondary bale movement assembly may be included to move a bale in the bale chamber in a direction that is transverse to the movement of the bale produced by the primary bale assembly, such as is disclosed in U.S. Pat. Nos. 9,027,863 and 9,204,597. A bale lift assembly 56 may be included to lift a bale into the bale chamber, such as through an opening formed by the movement of the rear wall 50 of the perimeter.

A bale shredding assembly 58 may be configured to shred material off of a bale positioned in the bale chamber. The bale shredding assembly 58 may include a rotor housing 60 which defines a rotor chamber 62. The rotor chamber 62 may be in communication with the bale chamber 30 through the bale feed opening 38. The rotor housing 60 may have a pair of end walls 64 positioned at the ends of the rotor chamber, and may also have an access opening 66 to provide periodic access to the rotor chamber. A cover panel 68 may be mounted to the housing to selectively close the access opening. The rotor housing 60 may also have an outlet opening 70 through which material from the bale is moved or impelled out of the rotor chamber after removal from the bale. The bale shredding assembly 58 may also include a shredding rotor 72 which is primarily positioned in the rotor chamber 62, but may extend at least partially into the bale chamber to contact a bale in the bale chamber through the bale feed opening. The shredding rotor 72 may rotate about a rotation axis 74 which may be substantially horizontally oriented. The rotor 72 may have opposite ends 76 which are mounted on the frame and generally positioned adjacent to the end walls 64 of the housing. The shredding rotor may have a length measured between the ends 76 of the rotor. The shredding rotor may also include a plurality of flails 78 which are pivotally mounted with respect to the rotor and may extend through the bale feed opening 38 to engage a bale in the bale chamber.

A passage 80 may be formed on the bale shredder 10 that is positioned adjacent to the shredding rotor 72 for receiving material shredded or otherwise removed from the bale by the shredding rotor and thrown or impelled by the rotation of the rotor into the passage. The passage 80 may be in communication with the rotor chamber 62 and in some embodiments may extend in a substantially horizontal direction from the shredding rotor 72. Illustratively, the passage may extend generally transverse to the longitudinal axis of the frame and also may extend between the lateral sides of the frame. The passage 80 may extend below the bottom 28 of the bale hopper, as well as the floor 52 of the hopper. The passage 80 may have an upper surface 82 which defines a top of the passage and may also have a lower surface 84 which is positioned in substantial opposition to the upper surface 82 and which defines a bottom of the passage. The passage may have an entry 86 which is positioned adjacent to the bale shredding rotor and may be in communication with the rotor chamber 62 to facilitate movement of shredded bale material from the rotor to the interior of the passage. The passage may also have an exit 88 located at an opposite end from the entry 86, and through which the shredded bale material may exit the passage. The passage 80 may have a width that is approximately equal to the length of the shredding rotor 72, and may also have a length that extends for a distance that is approximately equal to the chamber bottom 34 of the bale hopper. The passage may also have a height measured between the upper surface 82 and a lower surface 84 of the passage, and in some embodiments the height of the passage may be substantially uniform between the entry 86 and the exit 88 of the passage.

The bale shredder 10 may also include a collecting auger assembly 90 which is configured to collect material ejected by the shredding rotor of the bale shredding assembly, such as material that has passed through the passage 80. The collecting auger assembly 90 may be positioned at the exit 88 of the passage such that the passage is positioned between the shredding rotor and the collecting auger assembly. The collecting auger assembly may extend along the exit of the passage, and may extend along substantially an entirety of the exit's length. The collecting auger assembly may have a receiving end 92 which may be positioned adjacent to the exit 88 of the passage, and thus may be where material is introduced into the auger assembly for movement. The auger assembly may also have a delivery end 94 toward which the material is moved by operation of the assembly 90.

The collecting auger assembly 90 may comprise an auger housing 96 which defines an auger chamber 98. The auger housing 96 may extend along the exit of the passage 80 such that substantially an entirety of the exit is aligned with a portion of the auger housing. The auger housing 96 may be substantially closed at the receiving end 92 of the collecting auger assembly 90, and may be substantially open at the delivery end 94 of the assembly 90 to form a delivery opening 100. The auger housing 96 may have a substantially cylindrical shape with a first diameter, which may be substantially uniform from the receiving end to the delivery end. In some embodiments, a portion of the auger housing that is located adjacent to the delivery end 94 may have a cross-sectional area that is generally greater than the area defined by the first diameter. The collecting auger assembly 90 may also include an auger with an auger shaft 104 which may be rotatable with respect to the frame about a rotation axis 106 which may be oriented substantially parallel to the rotation axis 74 of the shredding rotor. The auger assembly 90 may also include auger flighting 108 mounted on at least a portion of the auger shaft 104 positioned in the auger chamber 98. The auger flighting 108 may extend from the receiving end 92 toward the delivery end 94 to cause movement of shredded material from the receiving end toward the delivery end when the auger shaft is rotated. The auger flighting may have a helical shape that is generally centered on the auger shaft 104.

Significantly, the delivery opening 100 of the auger housing may be substantially free of obstructions that would narrow the cross-sectional area of the auger chamber at the delivery end which could catch and hold shredded material moving in the auger assembly and attempting to move through the delivery opening. For example, the delivery opening 100 is free of any bearing or bushing for the auger shaft 104 as well as any supporting structure for the bearing or bushing.

The bale shredder 10 may also include a discharge assembly 110 that is configured to discharge the shredded material at an elevated vertical level with respect to, for example, the upper opening 32 of the bale hopper 28. The discharge assembly 110 may receive shredded material from the collecting auger assembly and discharge the shredded material from a discharge opening 112. The discharge assembly 110 may comprise a discharge housing 114 which defines an interior 116. The interior of the discharge housing may be in communication with the auger chamber 98. The discharge housing 114 may have an inlet opening 120 which may be in communication with the delivery opening 100 of the auger housing 96. The auger shaft 104 and the rotation axis 106 of the auger shaft may extend through the inlet opening 120 (see, e.g., FIG. 3). The auger shaft 104 may extend through the interior 116 of the discharge housing 114 (see, e.g., FIG. 3), and the shaft 104 may extend through an aperture 118 formed in a forward side 119 of the discharge housing 114 (see, e.g., FIG. 3). The discharge housing 114 may also form the discharge opening 112. The discharge housing 114 may comprise a main portion 122 which forms the inlet opening 120, and the main portion may be substantially cylindrical in shape with a second diameter. The second diameter of the main portion of the housing 114 may be greater than the first diameter of the auger housing 96, and the second diameter may be greater than approximately twice the first diameter and in some embodiments the second and may be approximately three times the first diameter. The inlet opening 120 may be positioned substantially centrally of the substantially cylindrical main portion of the housing. The discharge housing 114 may also include a discharge portion 124 which may extend from the main portion for receiving shredded material ejected from the main portion of the housing. The discharge portion may form a chute of narrower width that extends tangentially from the main portion and may terminate at the discharge opening 120. In some embodiments, the orientation of a section of the discharge portion may be changed to permit the discharged material to be directed in various directions.

The discharge assembly 110 may also include a discharge rotor 126 which is configured to receive the shredded material from the collecting auger assembly and expel the material through the discharge opening 120. The discharge rotor 126 may rotate about the rotation axis 106 of the auger shaft 104, and may be mounted on the auger shaft 104 of the collecting auger assembly such that the discharge rotor rotates at a speed that is substantially the same as the auger shaft. The discharge rotor 126 may have a center 128 about which the rotor rotates, and the inlet opening 120 may be substantially aligned with the center 128 of the rotor. The delivery opening 100 of the auger housing and the inlet opening 120 of the discharge housing may be substantially aligned with the center 128 of rotation of the discharge rotor. In some embodiments, the discharge rotor comprises a centrifugal fan having a plurality of radially extending blades 129 that produces an air flow to carry the material through and out of the discharge housing 116. In some configurations, the auger shaft 104 may extend through the interior 116 and the aperture 118 in the front side 119 of the discharge housing (see, e.g., FIG. 3) and have a pulley or sprocket mounted thereon for being connected to a rotation shaft, such as the coupling shaft 26 (with a forward end configured to be coupled to the PTO of the towing vehicle), to power the operation of the discharge rotor 126 and the auger shaft.

The bale shredder 10 may also include a conveying assembly 130 which is configured to facilitate material flow in the passage 80. The conveying assembly 80 may have a conveying surface 132 which is configured to move in a flow direction oriented substantially perpendicular to the rotation axis 74 of the shredding rotor, and may as well be perpendicular to the rotation axis 106 of the auger shaft. The conveying surface 132 may form at least a portion of the lower surface 84 of the passage, a portion which most beneficially may be located toward the exit 88 of the passage. The conveying assembly 130 may comprise a conveying belt 134 of which a portion may form the conveying surface 132 and may be an endless loop. The conveying belt 134 may have a width that is substantially equal to the width of the passage 80 such that movement of material passing through the passage at all locations along the width may be assisted by the conveying assembly. The conveying assembly may also include a pair of conveying rollers 136, 138 on which the conveying belt 134 is mounted. The pair of conveying rollers may include an entry roller 136 which may be positioned toward the entry 86 of the passage and in exit roller 138 which may be positioned toward the exit 88 of the passage. The conveying belt 134 may be looped about the conveying rollers such that rotation of at least one of the rollers causes rotation of the conveying belt, as well as the other roller of the pair. In some embodiments, at least one of the rollers may be connected to the auger shaft 104 of the collecting auger assembly such that rotation of the auger shaft causes rotation of the connected roller. For example, a belt or chain entrained on pulleys or sprockets mounted on the auger shaft and a shaft of the exit roller 138 may transmit rotational motion therebetween.

It should be recognized that the conveying assembly may have other configurations, and some of those configurations may not be as advantageous as the belt-based conveying assembly described herein. For example, in some embodiments the conveying assembly may include one or more rollers without the inclusion of a conveying belt. The surfaces of the rollers, and primarily the upward facing surfaces of the rollers, may thus form the conveying surface on which material is conveyed through the passage 80 as the roller or rollers are rotated. Belt-based conveying assemblies are advantageous in the relative simplicity of construction, particularly when the length of the passage is relatively longer, and the continuous surface of the conveyor belt does not have the dips or gaps in the material path between rollers which may collect and divert a portion of the conveyed material from the desired path and becomes waste.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A bale shredder apparatus for shredding a bale of baled material, the bale shredder apparatus comprising:
a frame having a front and a rear;
a bale hopper mounted on the frame and defining an interior bale chamber for receiving a bale of baled material to be shredded, a bale feed opening being formed in the bale hopper, the bale hopper having a rear wall, a primary side wall defining one side of the bale chamber, and a secondary side wall opposite of the primary side wall to define an opposite side of the bale chamber, a floor of the bale hopper extending at least partially between the primary and secondary side walls;
a bale lift assembly mounted on the rear of the frame and configured to lift a bale into the bale chamber through an opening formed by movement of the rear wall in a rearward direction;

a bale shredding assembly configured to shred material of a bale positioned in the bale chamber, the bale shredding assembly including a shredding rotor and a rotor housing defining a rotor chamber in which the shredding rotor is positioned;

a collecting auger assembly having a receiving end positioned to collect material ejected by the bale shredding assembly, the collecting auger assembly having a delivery end opposite of the receiving end with a delivery opening, the collecting auger assembly including:

an auger housing defining an auger chamber, the auger chamber being in communication with the rotor chamber such that shredded material is movable from the rotor chamber to the auger chamber;

a collecting auger positioned in the auger housing, the collecting auger including an auger shaft extending through the auger chamber and being rotatable with respect to the housing about a rotation axis, the collector auger further including auger flighting mounted on at least a portion of the auger shaft positioned in the auger chamber;

a discharge assembly configured to receive shredded material from the collecting auger assembly and discharge the shredded material from a discharge opening, the discharge assembly comprising:

a discharge housing defining an interior in communication with the auger chamber through an inlet opening located on a rearward side of the discharge housing; and a discharge rotor in the interior of the discharge housing and including a plurality of rotor blades configured to receive the shredded material from the collecting auger assembly and expel the material through the discharge opening the discharge rotor including a centrifugal fan; and a power take off coupling assembly for coupling to a power take off of the towing vehicle to power operation of the discharge rotor of the discharge assembly and the auger shaft of the collecting auger of the collecting auger assembly, the power take off coupling assembly including a coupling shaft having a forward end configured to be coupled to the power take off of a towing vehicle;

wherein the auger shaft of the collecting auger extends from the auger chamber of the auger housing into the interior of the discharge housing through the inlet opening of the discharge housing such that the auger shaft forms a portion of the discharge rotor with the rotor blades being mounted on the auger shaft such that the discharge rotor rotates as a unit with the collecting auger about the rotation axis of the auger shaft; and wherein the auger shaft of the collecting auger extends through the interior of the discharge housing and through an aperture in a forward side of the discharge housing to connect to the coupling shaft of the power take off coupling assembly such that power received by the coupling shaft of the power take off coupling assembly from the power take off of the towing vehicle is transmitted through the discharge assembly to the collecting auger assembly.

* * * * *